June 19, 1934.  E. S. CULVER  1,963,353
BEARING AND LUBRICANT HOUSING
Filed Nov. 2, 1931
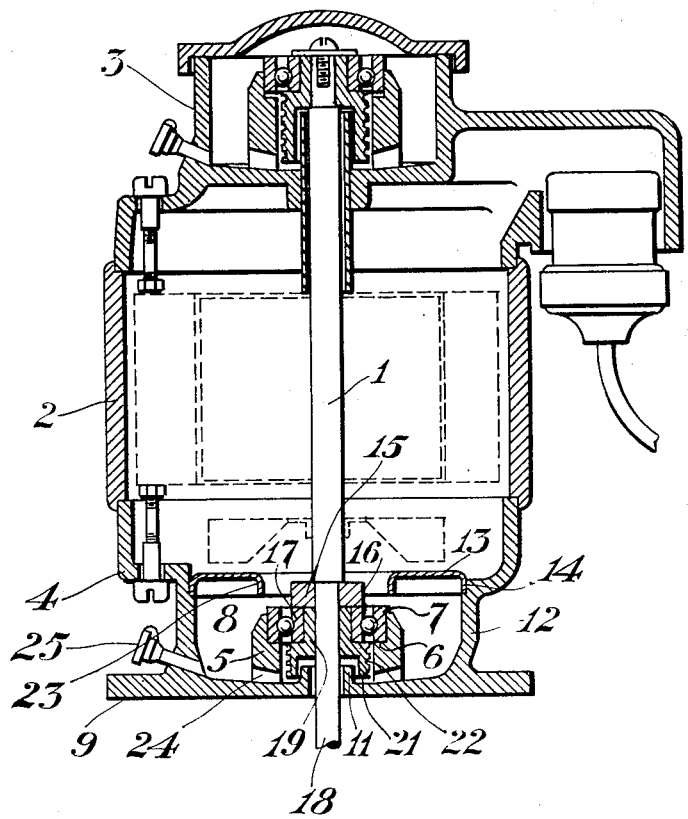
INVENTOR
*Edwin S. Culver*
BY
ATTORNEY Patented June 19, 1934

1,963,353

UNITED STATES PATENT OFFICE 1,963,353

BEARING AND LUBRICANT HOUSING

Edwin S. Culver, Oakland, Calif., assignor to Oliver United Filters Inc., San Francisco, Calif., a corporation of Delaware Application November 2, 1931, Serial No. 572,475

10 Claims. (Cl. 308—168)

This invention is a continuation in part of my application Serial Number 682,911 filed December 27, 1923 and relates to a thrust bearing and lubricant housing adapted for use in connection with electric motors for dish washers and the like and has particular reference to motors which although primarily designed to operate in a vertical position may be laid in any convenient position without spilling oil. Most motors are designed to operate in some predetermined fixed position, normally in a vertical or horizontal position and to be maintained in that position, and as a consequence no provision need be made for a lubricating chamber for the shaft bearings which will retain its contents regardless of the position which the motor is made to assume.

In general the object of my invention is the provision of a self-lubricating bearing intended to normally operate in a vertical position but capable of being turned in any position and still retain its supply of oil without spilling.

More specifically one of the objects of my invention is the provision of a bearing assembly comprising a central counter-bored hub surrounded by a substantially continuous annular lubricant chamber and provided with a seat for a ball race and passageways which establish communication between the lubricant chamber and the ball race and furthermore associated with means for circulating oil from the lower part of the lubricant chamber through the ball race and back to the lubricant chamber.

The invention possesses other advantageous features, some of which with the foregoing, will be set forth at length in the following description where I shall outline in full that form of my invention which I have selected for illustration in the drawing accompanying and forming part of the present specification. In said drawing, I have shown one form of my invention, but it is to be understood that I do not limit myself to such form, since the invention as set forth in the claims, may be embodied in a plurality of forms.

Referring to the drawing:

The single figure discloses a vertical mid-section of an electric motor embodying the objects of my invention.

As shown in the drawing the motor rotor is carried by a shaft 1 and is enclosed by a housing 2 and end bells generally designated as 3 and 4.

The end bell 4 comprises a central counter-bored hub 5 provided with a seat 6 for an outer ball race 7. An annular lubricant chamber or reservoir 8 is formed by the hub 5 and a cup which surrounds it and which is formed by the base 9 of the bell 4; the upwardly extending flange 11; the circular wall 12 and the annular inverted channel shaped cap 13 sealed in the recess 14 formed in the bell 4. Abutting against a shoulder 15 formed in the shaft 1, is a washer 16 which rests upon an inner ball race 17. The reduced end 18 of the shaft 1 has secured to it, merely by means of a tight fit, a bushing 19, the lower enlarged end 21 of which is provided with a spiral groove or labyrinth 22. It is to be particularly noted that the lower end 21 of the bushing 19 is counter-bored to accommodate the upwardly extending flange 11 of the bell 4, that the outer wall of flange 11 is spaced from the inner wall of the bushing 19 and that likewise the inner wall of the flange 11 is spaced from the reduced end 18 of the shaft 1. Under certain conditions a siphon is created in the space defined by the flange 11 and the shaft 1 and the space defined by the flange 11 and the bushing 19. In order to obviate any siphoning action of this character it is essential that the annular space between the flange 11 and the shaft 1 be sufficiently large to prevent capillary attraction.

It is also to be noted that the inner downwardly extending flange 23 terminates above the upper end of the hub 5 and is slightly spaced therefrom and that furthermore the inner diameter of the flange 23 is sufficiently large to permit the outer ball race 7 to pass through it. This dimension is critical inasmuch as it permits the entire bearing assembly to be drawn through the annular cap 13 without necessitating the removal of the cap.

Communication between the lubricant chamber or reservoir 8 and the annular space defined by the inner wall of the hub 5 and the spirally grooved wall of the bushing 19 is established by means of radially disposed passages 24 and in this connection it is to be noted that the floor of the oil chamber 8 has a slight downwardly and inwardly slope so as to insure the presence of oil at the foot of the spiral groove or labyrinth 22 in the bushing 19.

Oil is supplied to the lubricant chamber 8 by means of any suitable oil cup 25 located on the level at which it is desired to maintain the oil within the chamber.

The operation of the device, which in the absence of a better term may be called a bearing assembly, is as follows:

The lubricant chamber 8 is filled with oil to the predetermined desired level by means of the oil cup 25 and the oil is pumped by means of the spiral or labyrinth 22 which rotates with the shaft 1, through the space defined by the hub 5 and the bushing 19 to the ball races 7 and 17. The oil then flows over the upper outer edge of the ball race 7 and down the outer walls of the hub 5, thereby travelling a closed circuit. In this connection the annular space defined by the flange 23 of the cap 13 and the upper edge of the hub 5 is quite essential for if the flange 23 extended downwardly sufficiently far to contact with the upper edge of the hub 5 the circulation of the oil as just described would not be possible.

As has already been explained oil is prevented from passing between the space formed by the flange 11 and the shaft 1 by maintaining this space sufficiently large to avoid any siphoning action that might otherwise take place. Due to the particular construction of the lubricant chamber 8 it will be readily seen that the motor can be inverted or in fact turned in any position without danger of spilling its contents into the motor housing. For example if the entire motor is rotated in a clockwise direction in the plane of the drawing about any predetermined axis such as the inter-section of the axis of the shaft 1 with the base of the bell 4, the oil in the chamber 8 will flow to the right and when the axis of the motor assumes a horizontal position, the oil level describes a cord of the circular wall 12. When the motor is rotated through another 90 degrees so that it has been inverted, the oil flows into the channel shaped cap 23, the capacity of which has been made sufficient to accommodate at least the quantity of oil capable of being accommodated in the bottom of the lubricant chamber. Another 90 degrees again brings the motor to a horizontal position in which the oil level again assumes a cord of the circular wall 12 and the remaining 90 degrees of the 360 brings the motor back to its original position as shown in the drawing. From a consideration of this kind it may be seen that in any position which the motor is made to assume, the oil is prevented from spilling into the motor housing 2.

Although the art to which this invention pertains is a rather well developed one, the invention provides the following novel features: The entire bearing can be pulled through the annular cap 13 without the prior removal of the cap 13; although this feature is made possible by a circular opening in the cap 13, the construction of the cap is such as to prevent oil from spilling into the motor housing regardless of the position which the motor is made to assume; the circulation of the oil in a closed circuit through the ball bearing is made possible due to the fact that the cap 13 is spaced from the upper edge of the hub 5; and the siphoning of the oil between the flange 11 and the shaft 1 is prevented by making the space between these members sufficiently large to break the capillary attraction.

Although the end bells 3 and 4 are generally circular in form it is of course to be appreciated that the specific cross-sectional shape of the bell (that is a section taken at right angles to the section shown in the drawing) is not essential to the successful operation of my invention. Likewise the cross-sectional shape of the lubricant chamber 8 as shown in the drawing is essential only as to the particular features which have already been mentioned. For example the walls of the chamber 8 might well be made of curved lines instead of straight lines as shown in the drawing and still embody the object of my invention. Since the motor itself has formed no part of my invention it has been thought unnecessary to further complicate this specification by describing its details of construction.

I claim:

1. A bearing assembly of the character described comprising a cup; a counter-bored hub disposed in the center of the cup and forming therewith an annular lubricant reservoir; a bearing seat formed in said hub; an annular inverted channel shaped cap secured over said reservoir and having its inner edge spaced from the upper edge of said hub; and passageways in the base of the hub establishing communication between the annular reservoir and the interior of said hub.

2. A bearing assembly of the character described comprising a cup; a counter-bored hub disposed in the center of the cup and forming therewith an annular lubricant reservoir; a bearing seat formed in said hub; an annular inverted channel shaped cap secured over said reservoir and having its inner edge spaced from the upper edge of said hub; the inner diameter of said cap being greater than the outer diameter of the bearing seat formed in the hub.

3. A bearing assembly comprising a cup; a hub disposed in the center of said cup and forming therewith an annular lubricant chamber; a bearing seat formed in said hub; a bearing disposed in said seat; openings in the hub establishing communication between the lubricant chamber and the bearing; an annular cap secured over said chamber and having its inner edge spaced from the upper edge of said hub; and means for circulating oil from the lubricant chamber through the openings in the hub to the bearing and then over the upper edge of the hub to the chamber.

4. A bearing assembly comprising a cup; a hub disposed in the center of said cup and forming therewith an annular, channel shaped lubricant chamber; a bearing seat formed in said hub; a bearing disposed in said seat; openings in the hub establishing communication between the lubricant chamber and the bearing; an inverted, annular, channel shaped cap secured over said chamber and having its inner edge spaced from the upper edge of the hub; and means for circulating oil from the lubricant chamber through the openings in the hub to the bearing and then over the upper edge of the hub to the chamber.

5. A bearing assembly comprising a hub; a bearing seated in the upper portion of the hub; an annular lubricant container formed by said hub and a circular wall extending outwardly from the base of the hub and then upwardly to a level above the bearing; and an inverted channel shaped cap secured over the annular lubricant container and having its inner edge spaced from the bearing.

6. A bearing assembly comprising a hub; a bearing seated in said hub; an annular lubricant container formed by said hub and a circular wall extending outwardly from the lower portion of said hub, upwardly to a point above the level of the upper extremity of the hub, inwardly to a point substantially above the outer edge of the hub and then downwardly to a point slightly above said hub.

7. A bearing assembly comprising a hub; a ball race seated in said hub; an annular lubricant container formed by said hub and a circular wall extending outwardly from the lower portion of said hub, upwardly to a point above the level of the upper extremity of the hub, inwardly to a point substantially above the outer edge of the hub and then downwardly to a point slightly above said hub; passageways in said hub establishing communication between the lubricant container and the ball race; and means for circulating oil from the lower portion of the lubricant container to the ball race and over the upper edge of the hub to the container.

8. A bearing assembly comprising a hub; a bearing seated in said hub; an annular lubricant container formed by said hub and a circular wall extending outwardly from the lower portion of said hub, upwardly to a point above the upper extremity of the hub, inwardly to a point substantially above the outer edge of the hub and then downwardly to a point slightly above said hub; the floor of said lubricant container sloping downwardly towards said hub.

9. A bearing assembly comprising a hub; a bearing seated in the upper portion of the hub; an annular lubricant container formed by said hub and a circular wall extending outwardly from the base of the hub and then upwardly to a level above the bearing; and an annular inverted channel shaped cap secured over the lubricant container and having its inner edge spaced from the bearing; passageways in said hub establishing communication between the lubricant container and the bearing and means for circulating oil from the lower part of the lubricant container to the bearing and over the upper edge of the hub to the lubricant container.

10. A bearing assembly comprising a cored hub; a bearing seated in said hub; a shaft extending within the cored hub and supported by said bearing; an annular lubricant container surrounding said hub and formed by a wall extending outwardly from the lower portion of the hub, upwardly to a point above the level of the upper extremity of the hub, inwardly to a point substantially above the outer edge of the hub and then downwardly to a point slightly above the hub; passageways in the hub establishing communication between the lubricant container and the bearing; and means carried by said shaft for circulating oil from the lower portion of the lubricant container to the bearing and over the upper edge of the hub to the container.

EDWIN S. CULVER.